No. 733,375. Patented July 14, 1903.

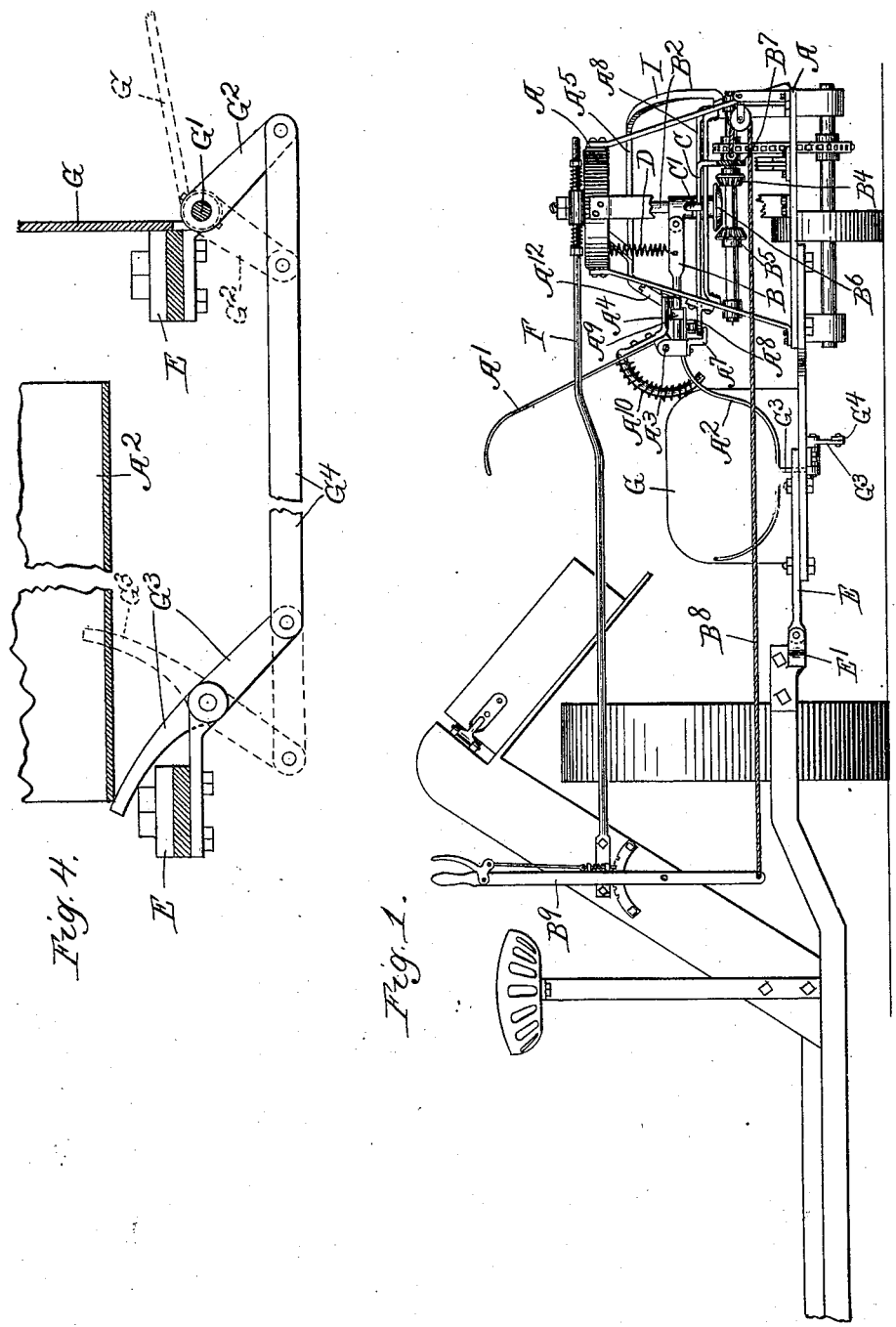

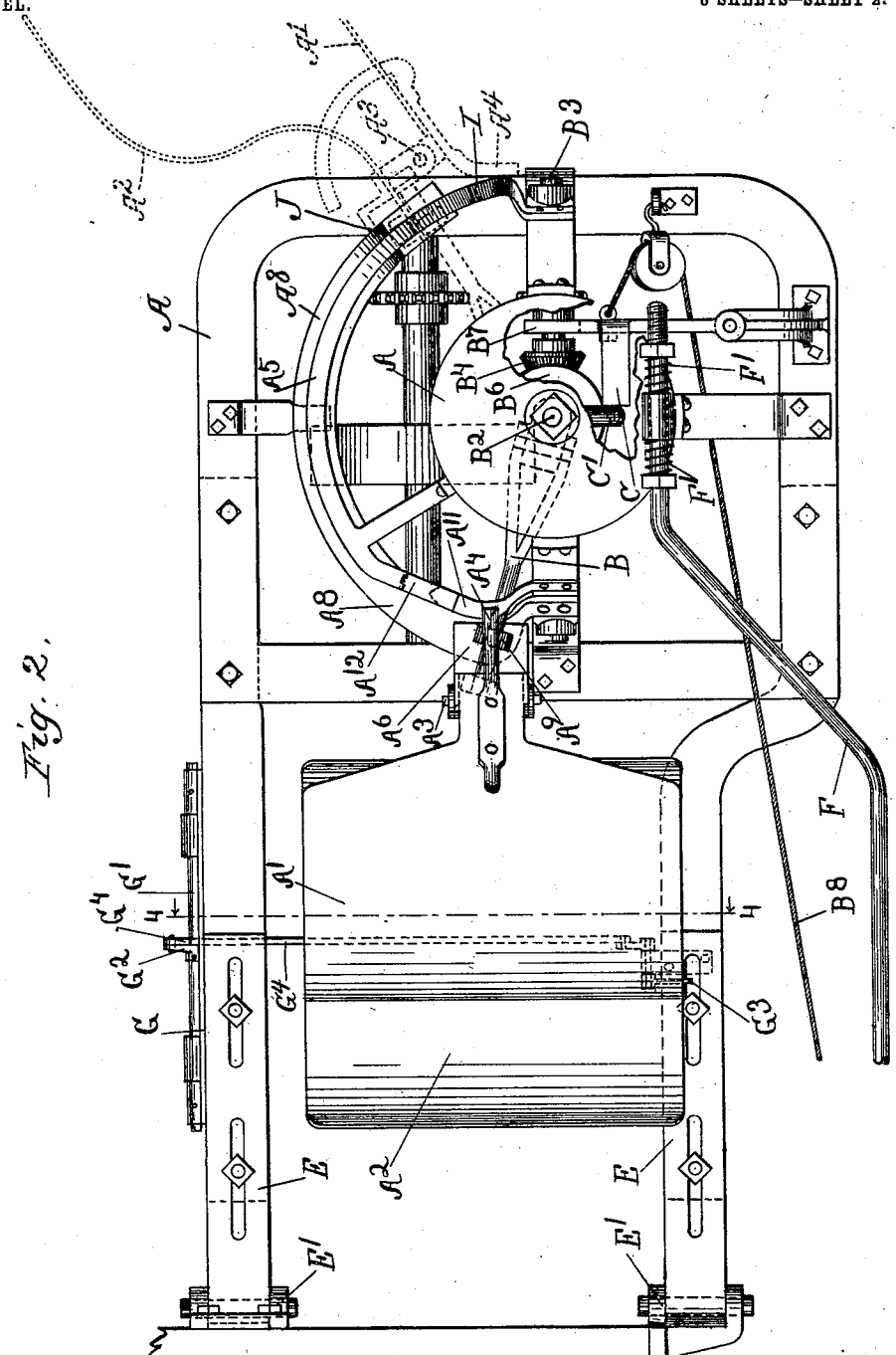

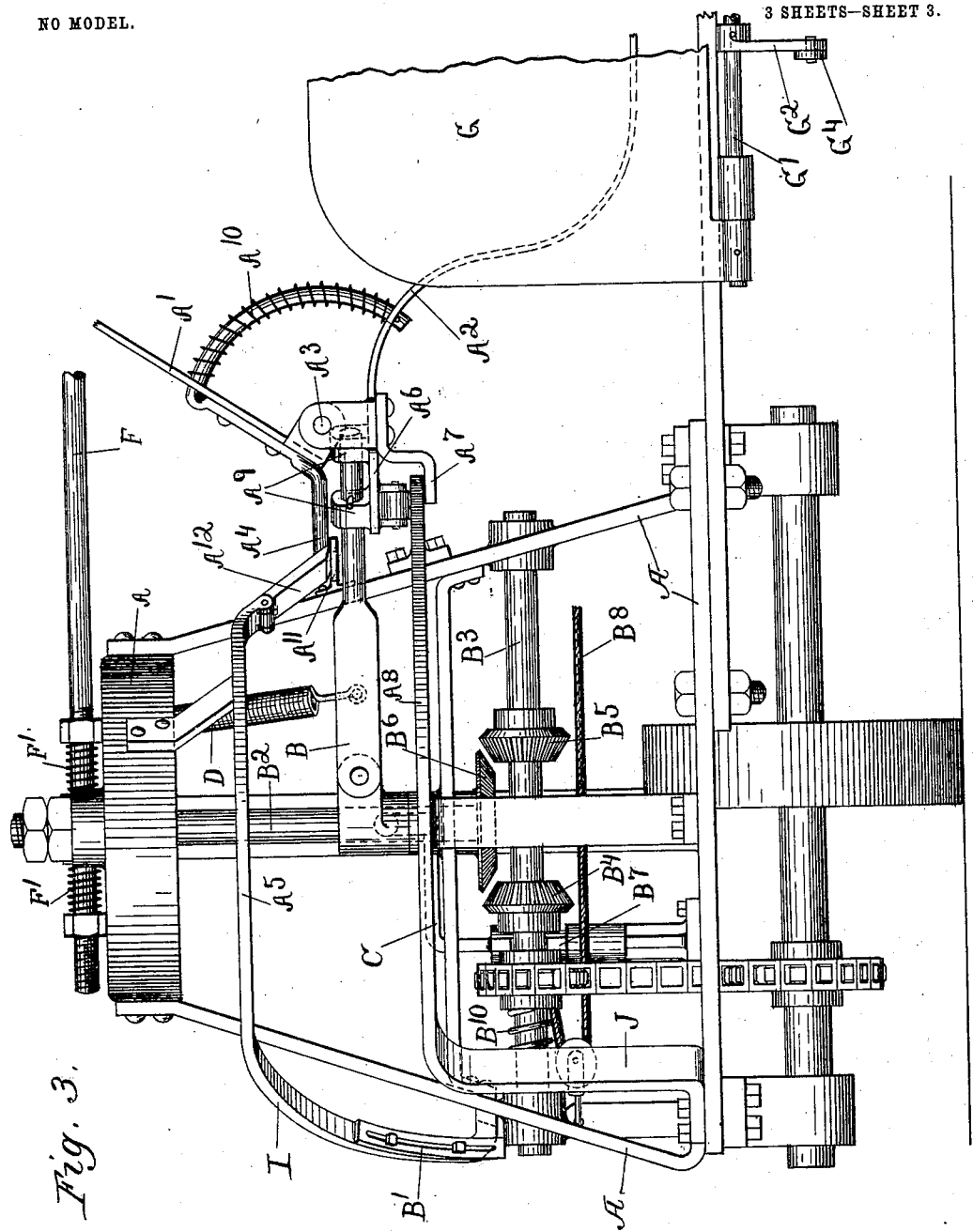

UNITED STATES PATENT OFFICE.

WILLIAM DOERING, OF SYRACUSE, INDIANA.

SHOCKING DEVICE FOR HARVESTING-MACHINES.

SPECIFICATION forming part of Letters Patent No. 733,375, dated July 14, 1903.

Application filed July 28, 1902. Serial No. 117,235. (No model.)

*To all whom it may concern:*

Be it known that I, WILLIAM DOERING, a citizen of the United States, residing at Syracuse, in the county of Kosciusko and State of Indiana, have invented a certain new and useful Improvement in Shocking Devices for Harvesting-Machines, of which the following is a specification.

My invention relates to devices for shocking grain or the like, and has for its object the production of a new and improved device for this purpose.

My invention is illustrated in the accompanying drawings, wherein—

Figure 1 is an elevation of a device embodying my invention shown in connection with a harvesting-machine. Fig. 2 is a plan view of the device shown in Fig. 1. Fig. 3 is an enlarged front elevation of the device shown in Fig. 1. Fig. 4 is a section on line 4 4, Fig. 2, with parts omitted.

Like letters refer to like parts throughout the several figures.

For purposes of illustration I have selected a simple construction embodying my invention, and I have shown this construction in a more or less diagrammatic manner, so as to simplify the description and make my invention more readily and easily understood. I have also illustrated a device adapted to be applied to the ordinary harvesting-machine now in use, and when so applied to take the bundles of grain as they come from the harvester and deposit them on end in proper association, so as to form suitable shocks. When my device is attached to a harvester, the entire process of harvesting is accomplished by the combined mechanism and through the agency of one man.

Referring now to the drawings, I have shown the mechanism of my device associated with a suitable frame A, mounted upon a supporting-wheel and connected with the harvesting-machine. Associated with this frame is a grain or bundle receiving device, adapted to receive the grain as it comes from the harvester. This bundle-receiving device may be of any suitable description. As herein illustrated, it comprises the coöperating parts $A'$ and $A^2$, which are separated when the device is in position to receive the bundles. There is associated with the bundle-receiving device means for causing the coöperating parts to grip together, so as to engage the bundles deposited therein, and also means for moving the receiving device on its end, so as to bring the bundles upright, and when in this position there is provided a suitable means for releasing the grip of the coöperating parts, so as to deposit the bundles in proper relation upon the ground in the form of a suitable shock.

It is of course evident that various constructions may be employed to carry my invention into effect, and I therefore do not limit myself to the construction herein shown and described.

As illustrated in the drawings, the coöperating parts $A'$ and $A^2$ are movably connected together, as by the pivot $A^3$. These parts are provided with devices by means of which they may be opened and closed, or, more accurately, with devices by means of which they may be moved to and from each other to grip or release the bundles. In the device illustrated in the drawings this result is attained by means of certain engaging pieces, which engage suitable guides associated with the frame. The part $A'$ is provided with the projecting engaging piece $A^4$, which engages the guiding device $A^5$, so that when the bundle-receiving device is moved in a predetermined manner the part $A'$ will be moved toward the part $A^2$. The guide $A^5$ is bent at its outer end, so as to be formed with a downwardly-projecting part I. The part $A^2$ is provided with the engaging pieces $A^6$ and $A^7$, which engage the guide $A^8$. The guide $A^8$ is bent downwardly, so as to form the downwardly-projecting part J. The bundle-receiving device is movably mounted upon a supporting or carrying arm B, connected with some suitable actuating mechanism. As herein shown, the engaging piece $A^6$ is provided with a suitable loop or loops $A^9$, through which the supporting-arm B loosely passes, so that the bundle-receiving device may be rocked or rotated about the arm. I prefer to associate with the parts $A'$ and $A^2$ a suitable means for separating them—as, for example, the spring $A^{10}$. The guide $A^5$ is connected to the separating-piece $A^{11}$ by means of a movable part $A^{12}$, which may either be a pivoted piece or a flexible spring-piece or the like. This movable part is arranged so that during the forward movement of the bundle-receiving device it stands rigid and causes the engaging piece A⁴ to ride upon the guide A⁵, while during the backward movement it moves aside to let the engaging piece A⁴ pass back to its initial position.

I prefer to provide the guide A⁵ with an adjustable piece B', by means of which the point at which the bundle-receiving device becomes disengaged therefrom may be adjusted. As herein illustrated, the arm B is connected with the shaft B², suitably mounted upon the frame and adapted to be connected and disconnected with the shaft B³, driven from any suitable source—as, for example, the supporting-wheel. As herein shown, the shaft B³ is provided with the bevel-gears B⁴ and B⁵, which are adapted to engage a bevel-gear B⁶ on the shaft B². The shaft B³ is preferably mounted so that it will have longitudinal movement, or at least the bevel-gears are arranged so that they may be moved with relation to the gear B⁶, and some suitable device is arranged to produce this movement. For this purpose I have shown a bifurcated piece B⁷, between the arms of which the shaft B³ passes. This bifurcated piece is controlled by the operator on the harvester by any suitable means—as, for example, by the rope B⁸—which may be attached to a foot or hand lever within reach of the harvester-seat. I have illustrated the rope as being connected to the lever B⁹, so that when said lever is moved in one direction the gear B⁵ is brought into contact with the gear B⁶, so as to rotate the shaft B². When the lever is moved in the other direction, the gears B⁵ and B⁶ are disengaged and the gears B⁴ and B⁶ brought into engagement. When the flexible connection B⁸ is used, I provide a spring B¹⁰, which moves the shaft B³, so as to disengage the gears B⁵ and B⁶ and bring the gears B⁴ and B⁶ into engagement.

When the bundle-receiving device is in its initial position where the bundles are received, the shaft B² should be entirely disconnected from the shaft B³. In the drawings I have shown this result as being accomplished by providing the bifurcated piece B⁷ with an upstanding and projecting part C, which is engaged by a part C', connected with the arm B or the shaft B². The parts are so arranged that when the bundle-receiving device is moved to its initial position the part C' engages the part C and moves the piece B⁷ a sufficient amount to disengage the gears, such position being shown, for example, in Fig. 3. I preferably provide the arm B with a retracting-spring D, which helps to return it to its initial position. This spring, of course, may be omitted or its location may be varied or other springs may be used in connection with it.

The shocking device is connected with the harvester in any desired manner, and I prefer to make this connection adjustable. As herein shown, this connection is made by suitable connecting-pieces E. These connecting-pieces are preferably made in two parts, and these parts are fastened together by bolts, the bolts passing through elongated slots, so that the length of the connecting-pieces may be varied. Said connecting-pieces are also preferably connected with the harvester by suitable hinges E' or some other movable connection, so that the parts may adjust themselves to inequality of the surface over which the machine is passing. I also prefer to provide one or more additional connecting-pieces F at the top of the device, which piece or pieces are preferably elastically connected with the frame of the shocking device—as, for example, by means of the springs F'. (Shown in Fig. 2.)

I also prefer to associate with the bundle-receiving device a suitable wing or movable plate or the like G, which prevents the bundles from being jolted out of the receiving device before being gripped thereby. This plate or wing is preferably movably mounted in proximity to the bundle-receiving device—as, for example, by being connected with the shaft G'. Connected with the shaft is a crank G², which is connected with the controlling-piece G³ by means of a suitable arm G⁴. This controlling-piece G³ is in the path of the bundle-receiving device. When the bundle-receiving device is moved to its initial position, it engages the part G³ and moves the wing up to its operative position, as shown in Fig. 4. When the bundle-receiving device moves away from its initial position, the part G³ is released and the wing falls down, so as to be out of the way, the parts taking the position shown in dotted lines in Fig. 4.

I prefer to provide the several engaging faces with friction-reducing devices—as, for example, by providing them with rotating wheels or other similar appliances. I prefer also to arrange the bundle-receiving device so that when the two parts are gripped together the tops of the bunch of bundles or of the shock will be smaller than the bottom, so that the bundles will be inclined more or less toward the center and will stand securely when released.

I have described in detail a particular device embodying my invention; but it is of course evident that I do not limit myself to this construction and that the parts may be varied in many particulars and some of the parts omitted and others used with parts not herein shown without in any manner departing from the spirit of my invention.

The use and operation of my invention are as follows:

When the device is suitably connected with a harvester and the parts are in the position shown, for example, in Fig. 1, the bundles as they come from the harvester are deposited in the bundle-receiving device, which is then in its initial position with the coöperating parts properly separated. After the desired number of bundles have been deposited the driver moves the lever $B^9$, and this motion is communicated by the rope $B^8$ to the bifurcated piece $B^7$ and thence to the shaft $B^3$, said shaft being moved so as to bring the gears $B^5$ and $B^6$ into engagement. The shaft $B^2$ then begins to rotate, and this motion is communicated through the supporting-arm B to the bundle-receiving device. As the bundle-receiving device moves away from its initial position it releases the piece $G^3$ and the wing G, which then drops out of the way. Said bundle-receiving device is then moved to its discharge position. During this movement the engaging piece $A^4$ passes along the piece $A^{12}$, and the guide $A^5$ and the coöperating parts of the bundle-receiving devices are gripped together, so as to grip the bundles and form them into a compact shock. The engaging pieces $A^6$ and $A^7$, associated with the part $A^2$, engage the guide $A^8$ during this process. The bundle-receiving device is then swung around until it is out of the path of the machine. The engaging piece $A^4$ then engages the part I of the guide $A^5$, and the engaging pieces $A^6$ and $A^7$ engage the part J of the guide $A^8$. Since these guides are curved at the points where they are bent, it will be seen that the bundle-receiving device will be tipped when these curved parts are reached, and then the weight of the bundles will turn the device upright. The bundle-receiving device is then turned up on end with the butts of the bundles down, the bundles being still gripped by the coöperating parts and being inclined at the top toward the center. When the parts reach this position, the operator will move the controlling-handle $B^9$, so as to disengage the shaft $B^3$ from the shaft $B^2$, and the bundle-receiving device with the bundles thereon will be moved down by gravity along the parts J and B', so as to be lowered with the butts in proximity to the ground, while still being tightly clasped. It is of course evident that the shafts $B^3$ and $B^2$ may be automatically disengaged when the bundle-receiving device reaches the parts J and I of the guides. I have omitted illustrating this feature in order to simplify the drawings; but it will be understood that any ordinary means for automatically disconnecting the shafts may be used for this purpose. When the engaging piece $A^4$ passes the lower end of the piece B', it is released, and the spring $A^{10}$ immediately separates the coöperating parts, so that the bundles are released. The operator now releases the lever or moves it back, so that the shaft $B^3$ is moved in the opposite direction longitudinally, so as to bring the gears $B^4$ and $B^6$ into engagement. The shaft $B^2$ is then rotated in the opposite direction and the bundle-receiving device moved back to its initial position. The spring D when used aids in moving the device rapidly away from the shock the moment the piece $A^4$ becomes disengaged from the part B'. During the backward movement of the bundle-receiving device the piece $A^4$ is beneath the guide $A^5$. As the parts approach their initial position the separating-piece $A^{11}$ passes between the piece $A^4$ and the support B, so as to slightly separate them. The movable part $A^{12}$ is then moved aside, so as to let the piece $A^4$ pass, and then falls back to its operative position, ready for the next operation of the machine. During the backward movement of the bundle-receiving device it is moved to its horizontal position by the engagement of the pieces $A^6$ and $A^7$ with the part J of the guide $A^8$. Just before the parts reach their initial position the part C', associated with the shaft $B^2$, strikes the part C and moves the bifurcated piece $B^7$, so as to move the shaft $B^3$ to a neutral position, where all the gears are out of position.

It is of course evident that all of the movements of the bundle-receiving device may be automatic. For example, the bundle-receiving device may be moved forward when there is a certain weight placed upon it, and it may be automatically tripped when it reaches its discharge position, so as to be moved back automatically; but I have shown these operations as produced by hand, so as to avoid complication and make my construction more easily understood.

It will be seen that by means of this device the grain may be cut and bound and shocked and the entire operation of harvesting completed by one man located upon the harvester.

In Fig. 2 I have shown the bundle-receiving device in its unloading position in dotted lines, so as to made its operation more easily understood. It will be noted that when the bundle-receiving device is turned on end and opened to discharge the shock that part of the bundle-receiving device which is back of the shock is moved away by the spring upon being released, so that the shock will not be turned over or otherwise affected by the forward movement of the machine. The moment the two parts are opened the part at the rear moves away from the shock, and thus gives it plenty of time to move up out of the way before the machine is moved forward a sufficient amount to again bring it in contact with the shock. It will also be noted that the bundle-carrying device moves out in front of the machine in the construction shown in the drawings; but it is of course evident that this position may be varied, and it may be moved to the rear, if desired, the parts being arranged and adjusted for this purpose.

It will be noted that the bundle-receiving device is placed at an angle with the supporting-arm B. (See Fig. 2.) The purpose of this is to arrange the parts so that when the receiving part is turned up on end and lowered the shock will be substantially vertical to the ground. Since this arm is lowered at one end, unless some such provision is made it will be seen that the shock would be inclined; but this angular relation obviates this difficulty.

The bundle-receiving device has its bundle-receiving space horizontal when the device is in its receiving position, and when I use the term "horizontal" I mean any approximately horizontal position.

I claim—

1. A grain-shocking device comprising a bundle-receiving device, provided with coöperating parts, the bundle-receiving space being horizontal when the device is in its receiving position, means for causing said parts to move relatively toward each other to grip the bundles, a moving mechanism for moving said bundle-receiving device to one side, and a controlling mechanism associated therewith for turning the bundle-receiving device after it has reached the limit of its side movement so that its bundle-receiving space will be vertical, and releasing the coöperating parts after the bundle-receiving device is moved to its said position.

2. The combination in a grain-shocking device, of a bundle-receiving device with the bundle-receiving space horizontal comprising two coöperating parts, a position-controlling mechanism associated therewith adapted to move said bundle-receiving device to one side and to turn it up on end after it reaches the limit of its side movement, and a controllable connection between said position-controlling mechanism and a driving-wheel upon the shocking device.

3. A grain-shocking device comprising two coöperating parts with a bundle-receiving space between them, said bundle-receiving space being horizontal when the device is in its receiving position, a supporting-arm upon which said parts are movably mounted, a connection between said arm and a driving part whereby the arm may be moved to and fro, and a position-varying device for turning the bundle-receiving device when it reaches the limit of its to-and-fro movement farthest from the receiving position, so that its bundle-receiving space will be vertical.

4. A grain-shocking device comprising coöperating parts having a bundle-receiving space between them, said bundle-receiving space being horizontal when the device is in its receiving position, a supporting part therefor, an operative connection between said part and a driving part whereby the coöperating parts are moved to and fro, a controlling mechanism for moving the coöperating parts together to grip the bundles, a position-changing device for turning the bundle-receiving device when it reaches the limit of its to-and-fro movement farthest from the loading position, so that its bundle-receiving space will be vertical, and releasing the coöperating parts when the bundle-receiving device reaches its desired position.

5. A grain-shocking device comprising coöperating parts between which the several bundles of the shock are received, a supporting part therefor, an operative connection between said part and a driving part whereby the coöperating parts can be moved to and fro, a controlling mechanism for moving the coöperating parts relatively to grip the bundles, a position-changing device for moving the bundle-receiving device so that its bundle-receiving space will be vertical, and releasing the coöperating parts when the bundle-receiving device reaches its discharge position, and comprising an adjustable part by means of which the distance of the shock from the ground at the time of the release may be adjusted.

6. A grain-shocking device comprising a bundle-receiving device with its bundle-receiving space horizontal when the device is in its receiving position, a controlling mechanism for moving said bundle-receiving device so that its bundle-receiving space will be vertical and then dropping it toward the ground, and an adjusting device for adjusting or varying the distance through which the bundle-receiving device is dropped.

7. A grain-shocking device comprising a bundle-receiving device having two coöperating parts, the bundle-receiving space being horizontal when the device is in its receiving position, an engaging piece attached to each of said coöperating parts, a support for said coöperating parts adapted to be moved about a fixed point on the shocking device, a driving part for such support, an operative connection between said support and the driving part, and a guiding device for said engaging pieces on the coöperating parts of the bundle-receiving device and which acts to control the said coöperating parts.

8. A grain-shocking device comprising a bundle-receiving device with its bundle-receiving space horizontal when the device is in its receiving position, a supporting-arm upon one end of which the bundle-receiving device is movably mounted, a driving-shaft to which the other end of said supporting-arm is attached, and means for moving said bundle-receiving device with relation to the supporting-arm for turning it so that its bundle-receiving space will be vertical.

9. A grain-shocking device comprising a bundle-receiving device provided with coöperating parts, the bundle-receiving space being horizontal when the device is in its receiving position, a supporting-arm upon which the bundle-receiving device is movably mounted, a controllable connection connecting said arm with the driving part, suitable engaging pieces connected with each of the coöperating parts of the bundle-receiving device, a separate guide for each of said coöperating parts between which said supporting-arm passes and along which the engaging pieces thereon travel, said guides changing in position at a predetermined point to turn the bundle-receiving device, so that its bundle-receiving space will be vertical.

10. A grain-shocking device comprising a bundle-receiving device, a sheet or wing controlled thereby opposed to the end thereof to engage the ends of the bundles when the bundle-receiving device is in its initial position, and a controlling mechanism for said wing projecting beneath the bundle-receiving device and controlled by the opposite end thereof.

11. A grain-shocking device comprising two coöperating parts between which the bundles are received, a supporting-arm upon which said coöperating parts are mounted, means for connecting said arm with a driving part so as to move the coöperating parts to and fro, a guide engaged by one of said coöperating parts during the movement away from the initial position, so as to vary the relative position of the said coöperating parts, said guide arranged to become disengaged with the coöperating part at the unloading position, a portion of said guide being movable so as to permit the passage of said coöperating part during its return to its initial position, and a stop for holding said movable portion rigid when the parts are moved in one direction, and permitting movement thereof when the parts are moved in the opposite direction.

12. A grain-shocking device comprising a grain-receiving device with its bundle-receiving space horizontal when the device is in its receiving position, and provided with coöperating parts, a supporting-arm to which said bundle-receiving device is movably connected, said arm connected at one end to a rotatable part mounted in fixed bearings on the shocking device, means for moving said coöperating parts toward each other to grip the bundles, and a position-controlling device adapted to move the parts when they are gripped together to turn the bundle-receiving device so that its bundle-receiving space will be vertical.

13. A grain-shocking device comprising two coöperating parts with a bundle-receiving space between them in a horizontal position when the coöperating parts are in their receiving position, said parts movably mounted upon a supporting-arm having a movement about a fixed point, an operative connection between said arm and a driving part so that the arm may be moved to and fro about said fixed point, and a position-controlling device which acts during the latter part of the movement of said arm to turn the coöperating parts so that the bundle-receiving space will be vertical, and release said coöperating parts when they reach a predetermined position.

14. A grain-shocking device comprising a bundle-receiving device having two coöperating parts between which the bundles are received, a single supporting-arm upon which said parts are supported, an operative connection between said arm and a driving part, two bent guiding devices one associated with each of said coöperating parts and adapted to vary the position of said coöperating parts when the arm is moved.

15. A grain-shocking device comprising a frame, a bundle-receiving device having two coöperating parts between which the bundles are received, a supporting-arm therefor secured at one end for movement about a fixed point, an operative connection between said arm and a driving part, two bent guiding devices one associated with each of said coöperating parts and adapted to vary the position of said coöperating parts when the arm is moved one of said guiding devices arranged to release one of the coöperating parts when the discharge position is reached.

16. A grain-shocking device comprising two coöperating parts with a bundle-receiving space between them horizontal when the device is in its receiving position, mechanism for moving said parts, so that the bundle-receiving space will be vertical, to discharge the shock, an actuating mechanism for moving one of the parts rearwardly away from the shock while the machine is moving forward, and a lifting mechanism for simultaneously lifting the bundle-receiving device before said part again comes into contact with the shock.

17. A shocking device for harvesters comprising a bundle-receiving device made up of a plurality of parts with the bundle-receiving space horizontal when the device is in its receiving position, means for moving the bundle-receiving device, so that the bundle-receiving space will be vertical, to discharge the shock, an actuating mechanism for moving the part back of the shock rearwardly away from said shock to compensate for the forward movement of the machine, and means for lifting the bundle-receiving device out of the way of the shock before it again comes into engagement therewith on account of the forward movement of the device.

18. A grain-shocking device for harvesters comprising a bundle-receiving device with its bundle-receiving space horizontal when the device is in its receiving position, a supporting-arm for said bundle-receiving device, a controlling mechanism for moving said bundle-receiving device so that its bundle-receiving space will be vertical, and dropping it to its discharge position, said bundle-receiving device bent out of line with said arm so that when it reaches its discharge position it will remain substantially vertical.

19. A grain-shocking device for harvesters comprising a frame, a vertical shaft rotatably mounted on said frame, an arm connected with said shaft, a bundle-receiving device movably connected with said arm and having its bundle-receiving space horizontal when the device is in its receiving position, a driving-shaft on the device, connections between the driving-shaft and the vertical shaft whereby the two shafts may be alternately connected and disconnected so as to vary the position of the bundle-receiving device.

WILLIAM DOERING.

Witnesses:
   B. F. HOY,
   CHAS. S. MILLER.